United States Patent

[11] 3,615,691

| [72] | Inventors | Adrianus Henricus Antonius Van Den Oord Duiven;<br>De Vries, Bartholomeus, Arnhem, both of Netherlands |
|---|---|---|
| [21] | Appl. No. | 794,360 |
| [22] | Filed | Jan. 27, 1969 |
| [45] | Patented | Oct. 26, 1971 |
| [73] | Assignee | Lever Brothers Company<br>New York, N.Y. |
| [32] | Priority | Feb. 2, 1968 |
| [33] |  | Great Britain |
| [31] |  | 5,328/68 |

[54] PRESERVATION OF MEAT COLOR
8 Claims, No Drawings

[52] U.S. Cl. .................................................. 99/107, 99/157, 99/222

[51] Int. Cl. ........................................................ A23b 1/00, A231 3/34
[50] Field of Search ............................................ 99/107, 157, 222, 224; 260/308

[56] References Cited

UNITED STATES PATENTS

| 2,541,572 | 2/1951 | Coleman et al. ............... | 99/107 |
| 2,863,777 | 12/1958 | Dekker ......................... | 99/157 |
| 3,235,558 | 2/1966 | Harrison ....................... | 260/308 |

Primary Examiner—Hyman Lord
Attorneys—Louis F. Kline, Jr., Melvin H. Kurtz and Edgar E. Ruff ABSTRACT: Meat products are given a stabilized color by means of tetrazole.

PRESERVATION OF MEAT COLOR

This invention relates to a process for treating meat products to obtain a more desirable, stable color.

The invention also relates to compositions used in this process and to meat products obtained therewith.

The term "meat products" as used herein, comprises both fresh meat products, either stored under vacuum or not, and meat products, which are subjected to a preservation process such as curing, processing, reforming, dehydration, freeze-drying, irradiation, freezing, canning and smoking.

It is well known that the desirable red color of fresh meats fades rapidly during storage. The same discoloration is also observed in meat products which are subjected to a preservation treatment, especially under light, vacuum refrigeration or frozen conditions.

This discoloration is due to chemical changes of the pigments present in the meat. By these pigments we mean compounds like myoglobin and hemoglobin comprising complexes of certain proteins with ferrous haem and ferric haem including both their oxygenated and deoxygenated forms. In their reduced state myoglobin and haemoglobin are purple-red, but in taking up oxygen they form oxymyoglobin and oxyhaemoglobin respectively, which are bright red. On oxidation the greyish brown metmyoglobin and methaemoglobin are formed.

It has been found that by bringing about an interaction of meat products with a sufficient amount of tetrazole,

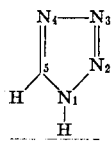

meat products can be obtained having a desirable stable red color. Although the pH at which this interaction is brought about is not critical and may vary between rather wide limits, for example between 4 and 8, it is preferred to maintain the pH in the range of 4.5 to 6.5 which is the normal pH of meat products when in a consumable condition. Tetrazole has several advantages over the products used in the prior art as stabilizers of the color of meat. In the first place it will form complexes with the indicated pigments, which are stable in the indicated pH range even without employing excessively high amounts. Furthermore, as opposed to the complex obtained with sodium nitrite and sodium nitrate, for example, the formed complex is insusceptible to the influence of light and oxygen. The complex is tasteless and it has no adverse effect on the taste and color of the meat product when fried for example.

The contact of the meat product with tetrazole can be achieved by several methods, which of course differ with the kinds of fresh and cured meat respectively. Thus it is possible to apply the tetrazole either in a solid form, for example, as a powder, or in the form of an aqueous solution, onto the surface of a body of meat or to soak or immerse the body of meat in such aqueous solution. In the latter case the final result will be dependent on the rate of penetration of tetrazole into the meat, so the time of treatment will of course vary with the form and dimension of the meat product used. In still another embodiment of the process according to the invention and aqueous solution of the tetrazole may be injected into the meat product. Finally in case of minced meat products tetrazole may be mixed intimately with the mince.

Since tetrazole is a weak acid, its aqueous solutions have a relatively low pH and a slightly acid taste. On contacting such solutions with meat products the buffering power of the latter is normally sufficient to maintain the final pH of the medium at the preferred level of 4.5 to 6.5. However, in particular when using concentrated solutions, it is preferred to adjust the pH of such solutions before use to about the same level, e.g. by neutralizing them with sodium hydroxide. This has no influence on the amount of tetrazole to be used, whereas the color of the thus-treated meat products, especially when treated superficially, is slightly more stable even than that of products treated with acidic solutions.

In a case in which the process is applied to cured meat products, it can be combined with the normal curing process, by applying the tetrazole in combination with the normally used curing agents such as kitchen salt, sugar, sorbic acid, and so on.

The quantity of tetrazole required will vary according to the form of meat product, the method of application used and the effective distribution throughout the meat mass.

Satisfactory results have been obtained by employing tetrazole in the amounts specified below:

a. When applied superficially in an amount of 0.01-5 mg., preferably 0.2-0.6 mg. tetrazole per 1 sq. cm. surface of the meat product.
b. When applied by injection in pieces of meat or by mixing with minced meat an amount of 1-500 mg., preferably 10-100 mg. tetrazole per 100 g. meat product.
c. When applied by submersion and soaking an amount of 0.5-500 mg. preferably 1-100 mg. tetrazole per 100 g. meat product.

When applied to meat products which after the treatment are kept in a deep-frozen condition, e.g. at −20° C. or below, the above-mentioned preferred amounts of tetrazole can be reduced considerably, e.g. to about 20-30 percent of the given values or even less.

The invention is illustrated by the following examples.

EXAMPLE 1

Discolored beef was sprayed with a 20 percent aqueous solution of tetrazole at a temperature 3°-4° C, at a rate of 0.001-0.003 ml. solution per cm.$^2$ of the surface, corresponding to 0.2-0.6 mg. tetrazole per cm.$^2$ of the meat surface. A reddish color developed within 5 minutes after application and maximum color development was obtained after about 1 hour. This color was stable for the time that no bacteriological spoilage occurred in the controls, viz, 6-7 days at 2-4° C.

EXAMPLE 2

On repeating the procedure described in example 1, but using an aqueous solution of tetrazole which previously had been neutralized with sodium hydroxide to a pH of about 6.0, very similar results were obtained. The appearance of the beef was considered to be slightly better even than in example 1.

EXAMPLE 3

On repeating the procedure described in example 1, but reducing the amount of tetrazole to 0.02-0.1 mg./cm.$^2$ meat surface by decreasing the concentration of the spraying solution, also a marked improvement in color was produced, though the change in color was slower and less pronounced than with the more concentrated solution.

EXAMPLE 4

On repeating the procedure described in example 1, 2 and 3, but using balls or similar shapes of discolored minced beef, the same results were obtained as with whole beef.

EXAMPLE 5

Minced fresh lean beef was mixed with aqueous solutions of tetrazole containing 2.5, 5 and 10 percent tetrazole, at a rate of 1 ml. solution per 100 g. beef (i.e. 25, 50 and 100 mg. tetrazole per 100 g. beef), whereafter the beef was packed in a container sealed with an oxygen-permeable foil which was not in contact with meat. A bright red color developed which was stable for 10-12 days at 2° C. The lowest level still produced an appreciable improvement of the color although the concentration of 0.05 percent showed the best result.

EXAMPLE 6

Minced fresh lean beef was mixed with aqueous solutions of tetrazole of the same concentrations as described in example 4, whereafter the minces were packed in oxygen-impermeable pouches (Cryovac), vacuum-sealed and plate-frozen.

Even after storage for 4 months at −28° C. the minces had retained a fresh red color at all the concentrations used, whereas untreated controls had developed brown patches after less than 6 weeks.

EXAMPLE 7

The procedure described in example 6 was repeated, but now using solutions containing 0.5 and 1 percent tetrazole. The minces were packed, vacuum-sealed, plate-frozen and put in storage at −28° C. On terminating the experiment after 6 weeks, it was found that in both concentrations used the minces had retained a fresh red color.

EXAMPLE 8

On repeating the procedure of example 5, and using tetrazole solutions of the same concentrations, but now previously neutralized with sodium hydroxide to a pH of about 6.0, essentially the same results were obtained as in example 5.

EXAMPLE 9

Two pieces of each 500 g. pork meat (longissimus dorsi) were cured for 2 days at 15° C. the first piece in a brine consisting of 850 g. water, 150 g. kitchen salt and 0.5 g. sodium nitrite, the second piece in a brine of the same composition, but in 2.5 g. tetrazole and an equimolar amount of sodium hydroxide had been dissolved. After curing was finished, the pieces of meat were sliced and packed and vacuum-sealed in oxygen-impermeable pouches. On keeping the packages under the same conditions, it was found that the normally cured bacon had a shelf life of about half that of the bacon cured in the tetrazole-containing brine (viz about 6 to 10 weeks respectively) where after opening the pouches and exposing the bacon to air and light, the normally cured bacon discolored much more rapidly than the tetrazole-containing bacon.

What we claim is:

1. A process which comprises contacting a meat product with tetrazole at a pH of about 4–8 in an amount sufficient to stabilize the color of said meat.

2. The process of claim 1 wherein said contact is effected by distributing over the surface of said meat about 0.01 to 5 mg. tetrazole per sq. cm. surface area of the meat.

3. The process of claim 2 wherein the amount of tetrazole is about 0.2–0.6 mg. per sq. cm. surface area of the meat.

4. The process of claim 1 wherein said contact is effected by incorporating into said meat product about 1–500 mg. tetrazole per 100 g. of product.

5. The process of claim 4 wherein 10–100 mg. of tetrazole per 100 g. meat product is incorporated by penetrating said meat with an aqueous solution of tetrazole.

6. The process of claim 1 wherein 0.5–500 mg. tetrazole per 100 g. is incorporated by soaking in an aqueous solution of tetrazole.

7. The process of claim 6 wherein the amount of tetrazole incorporated in each 100 g. meat product is 1–100 mg. per sq. cm.

8. The process of claim 1 wherein said meat product is minced meat and said contact is effected by mixing with the minced meat 10–100 mg. tetrazole per 100 g. meat.

* * * * *